(12) United States Patent
Milano, Jr. et al.

(10) Patent No.: US 6,408,886 B1
(45) Date of Patent: Jun. 25, 2002

(54) DRIVE ATTACHMENT FOR THE DISCHARGE VALVE OF A RECREATIONAL VEHICLE

(75) Inventors: Arthur J. Milano, Jr., Burlington; Herman J. Parent, Winsted, both of CT (US)

(73) Assignee: Seitz Corporation, Torrington, CT (US)

( * ) Notice: Subject to any disclaimer, the term of this patent is extended or adjusted under 35 U.S.C. 154(b) by 0 days.

(21) Appl. No.: 09/922,569

(22) Filed: Aug. 6, 2001

(51) Int. Cl.⁷ ............................................... F16K 31/04
(52) U.S. Cl. .................. 137/899; 137/351; 251/129.11; 251/291
(58) Field of Search ................................ 137/899, 351, 137/354; 251/291, 129.11

(56) References Cited

U.S. PATENT DOCUMENTS

| | | | | |
|---|---|---|---|---|
| 5,056,544 A | * | 10/1991 | Stevens | 251/326 X |
| 5,445,190 A | * | 8/1995 | Gunder | 137/899 |
| 5,678,802 A | * | 10/1997 | Lunder | 137/899 X |
| 5,988,221 A | * | 11/1999 | Walker | 137/899 |
| 6,098,956 A | * | 8/2000 | Sprague, II | 251/129.11 |

* cited by examiner

*Primary Examiner*—Kevin Lee
(74) *Attorney, Agent, or Firm*—Dallett Hoopes

(57) ABSTRACT

This attachment assembly comprises a housing with channel-shaped walls with detents to snap over the valve housing. It also comprises an electrically powered rack and pinion drive which is fastened to the handle of the valve.

3 Claims, 4 Drawing Sheets

DRIVE ATTACHMENT FOR THE DISCHARGE VALVE OF A RECREATIONAL VEHICLE

FIELD OF THE INVENTION

This invention relates to a drive attachment assembly for the discharge valve of a recreational vehicle. In such an RV, as they are called, the discharge for waste is held in a holding tank within the body of the vehicle, and when the discharge port is connected to a suitable receiver, the valve may be manually opened to discharge waste by reaching into the valve compartment behind a little door at the side of the vehicle and pushing down a handle.

BACKGROUND OF THE INVENTION

Reaching into the holding tank compartment of an RV is not viewed as a pleasant experience, and often owners of such vehicles or their wives, avoid such a chore. In the U.S. Pat. No. 4,875,504 to Nicholson, the inventor provided a bolt-on attachment to an RV valve including an electrically powered screw drive to push down the handle of the discharge valve to open it. Such arrangements have been found desirable, considering the alternative. The bolt-on attachment has required, obviously, tools to attach it and has involved considerable lateral extension onto the housing of the valve.

SUMMARY OF THE INVENTION

Under the present invention the drive attachment may be snapped onto the housing of the discharge valve. It comprises a relatively flat drive housing which does not take up considerable space in the compartment.

The invention, thus, is an attachment for the discharge valve of an RV, the attachment being attachable onto the valve housing without the use of tools and comprising a back wall and integral side walls arranged in channel-shape and having snap-on detents on the inside of the distal ends of the side walls. The attachment also includes a reversible electric drive motor selectively powered to drive clockwise or counter-clockwise and a drive pinion on the shaft of the motor. A rack gear is disposed vertically in the attachment and engages a pinion.

The upper end of the rack is attached to one of the wings of the T-shaped handle normally provided on the valve. The attachment comprises a base at the upper end of the rack and a clip hinged to the base and adapted to snugly fit over the top of the wing and latch on the other side of the base to hold the handle securely.

BRIEF DESCRIPTION OF THE DRAWINGS

Further objects and features of the invention will be clear to those skilled in the art from a review of the following specification and drawings, all of which present a non-limiting form of the invention. In the drawings.

DESCRIPTION OF THE PREFERRED EMBODIMENT

Figure 1:
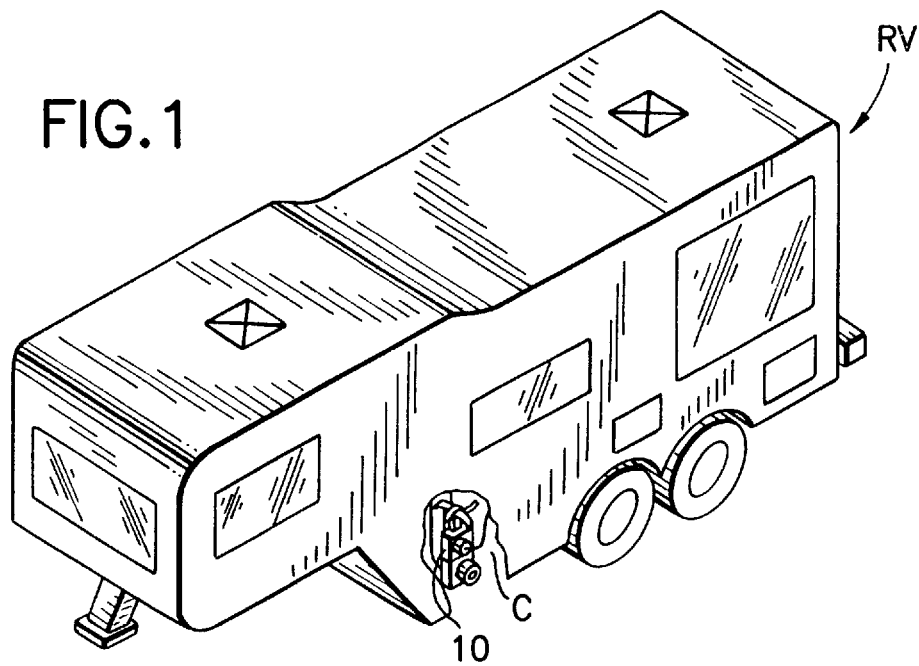
FIG. 1 is a perspective view of an RV, a portion of which is broken away to reveal the discharge valve.
Figure 2:
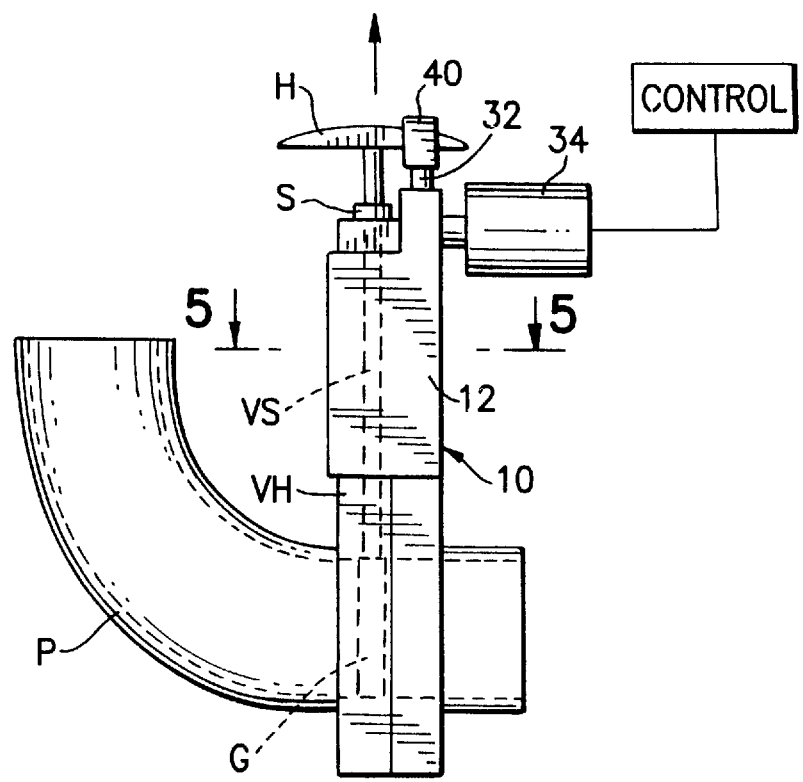
FIG. 2 is a greatly enlarged fragmentary side view of the discharge pipe and gate valve adapted to be vertically reciprocated by the handle. The valve has the attachment of the invention secured thereto.
Figure 5:
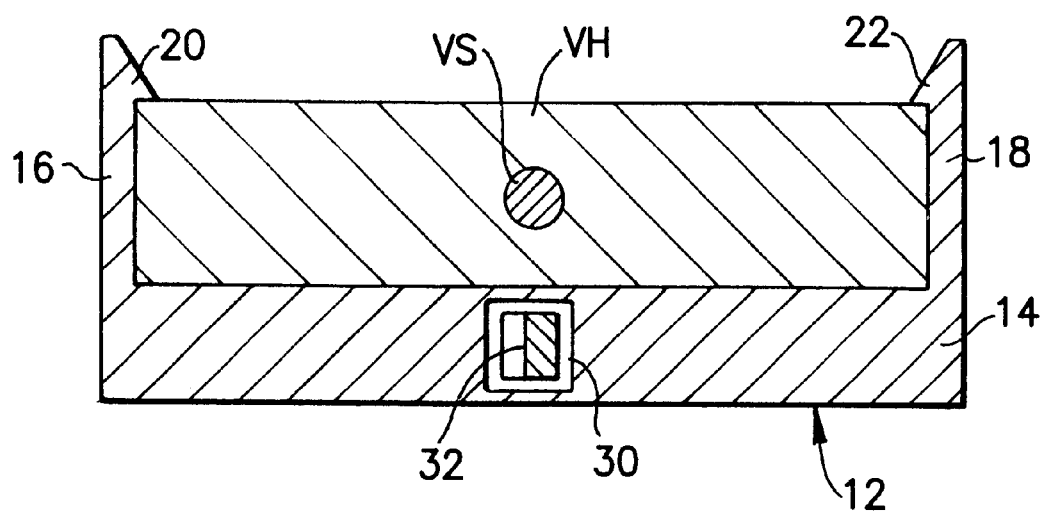
FIG. 5 is an enlarged sectional view taken on the line 5—5 of FIG. 2.

FIG. 2 shows the conventional discharge pipe P and valve housing VH including the operating handle H. The attachment assembly 10 of the invention comprises a housing 12 which embraces the valve housing VH. As shown in FIG. 5, the attachment comprises a channel-shaped body including a rear wall 14 and connected side walls 16 and 18. Adjacent their distal ends, the side walls have inward detents 20 and 22 respectively. In assembly with the valve housing VH, the attachment housing 12 is sufficiently resilient so that the side walls 16 and 18 can be cammed outward and snapped over and against the valve housing VH, the detents 20, 22 having appropriate lead-ins to facilitate this. In other words, the side walls 16 and 18 are spaced outward as the lead-ins progressively engage the valve housing and when the detents pass the ends of the housing VH, the side walls snap back in to secure the attachment housing 12 in place.

The valve housing VH includes a valve gate G having a valve stem VS which passes through a seal S at the upper end of the valve housing and is topped by the handle H.

Figure 3:
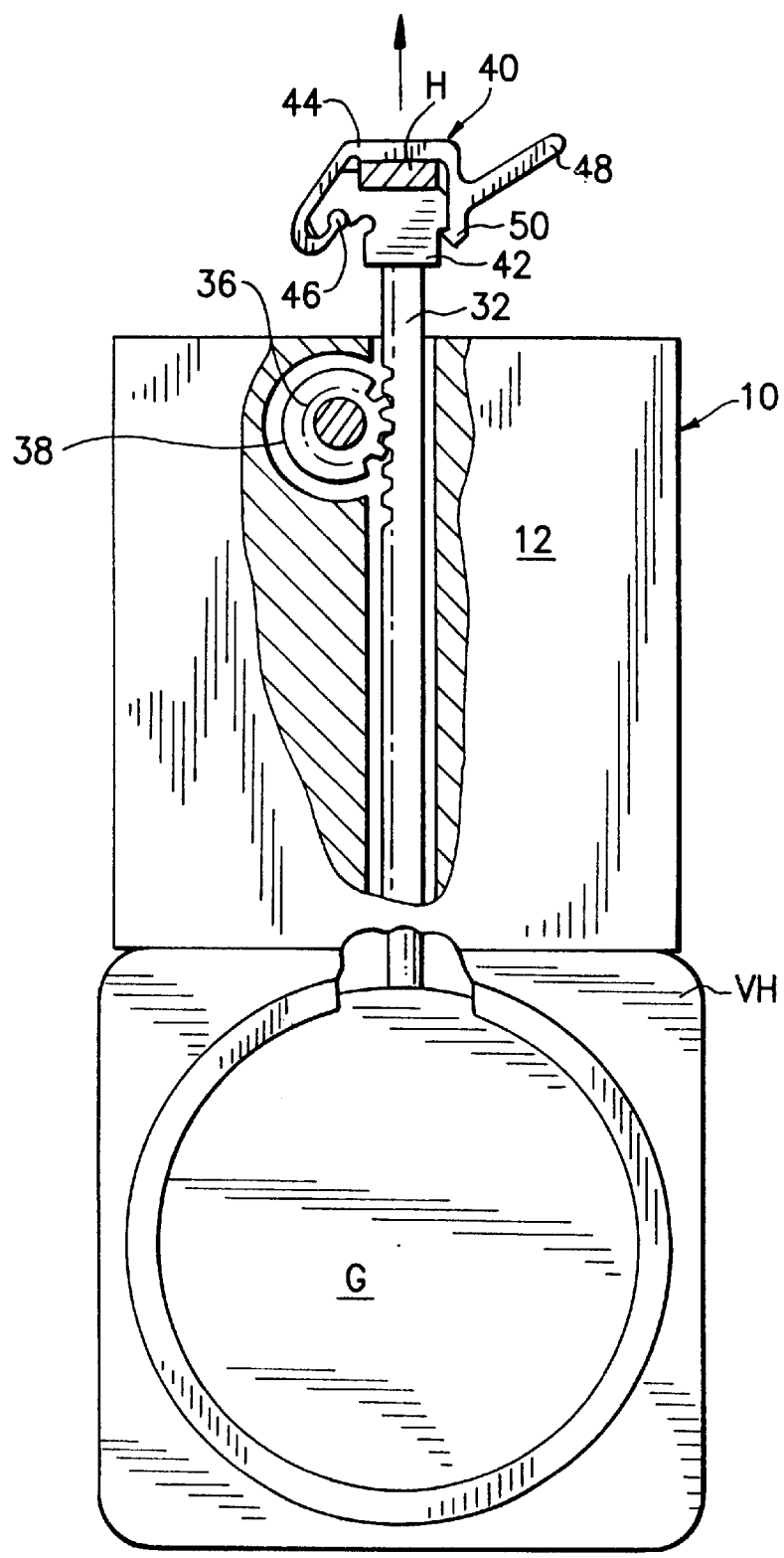
FIG. 3 is a greatly enlarged front view of the valve partly broken away to show the rack and pinion arrangement.
Figure 4:
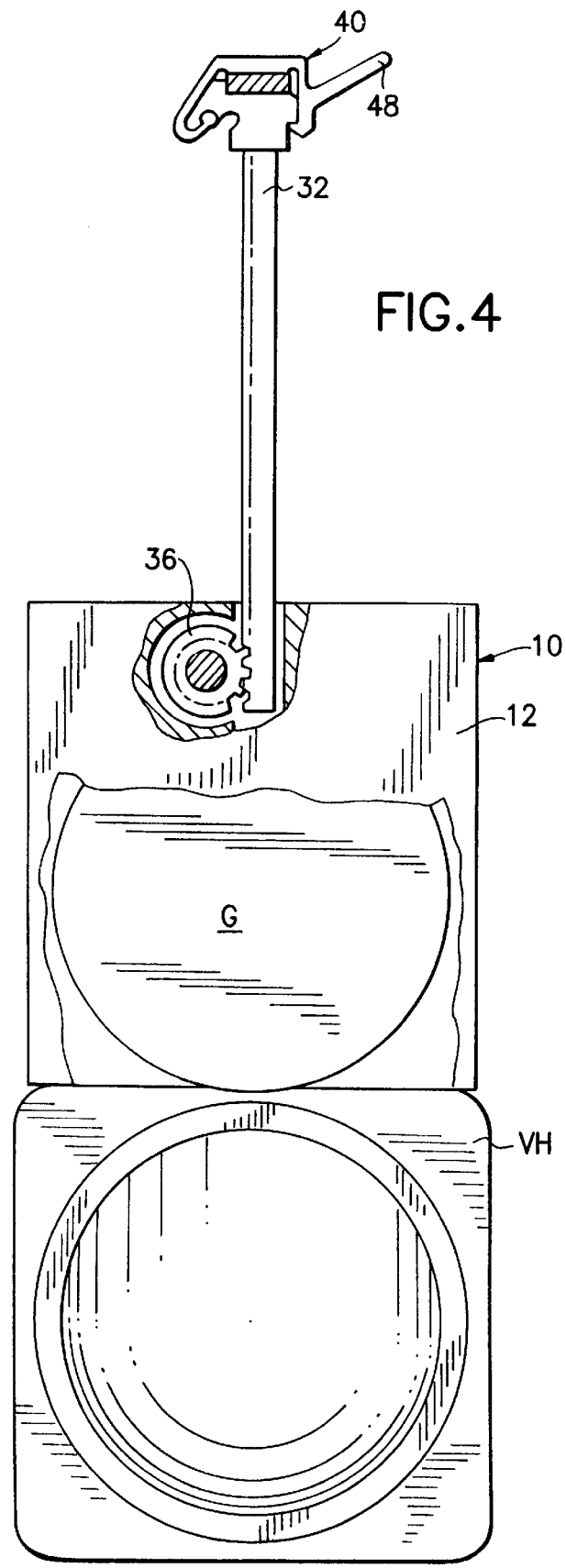
FIG. 4 is similar to FIG. 3 but showing the gate valve rack extended upward as when the valve is open.

The attachment housing 12 is formed with a vertical passage 30 in which the rack gear 32 connected to gate G is reciprocably disposed as shown in FIG. 2. The attachment housing 12 also mounts an electric motor or gear motor 34 which has on its shaft a pinion 36 rotatable in a hollow 38 inside the attachment housing. The pinion 36 engages the rack 32 in a conventional manner so that as the pinion rotates counter-clockwise, as shown in FIG. 3, it raises the valve rack 32 and, hence, the gate G of the valve.

The upper end of the valve rack 32 mounts a fastener 40 for securing the rack to a wing, the rightward wing as shown in FIG. 2, so that the rack 32 and the valve are secured releasably together for simultaneous movement. The fastener 40 comprises a base 42 attached to the upper end of the rack 32. Pivoted at one side of the base 42 is an end 43 of clip 44 of resilient material, the end 43 of the clip being either pivoted in a cavity in the base as shown or held therein, the clip being resilient enough to bend as necessary.

The opposite end of the clip is formed with a lift tab 48 and a latch 50 which snaps under the opposite side of the base 42 from the end 43 of the clip.

The dimensions of the clip 44 and base are such that when the clip is latched in place (FIG. 3) over the handle H, a secure attachment is made and thereafter rotation of the pinion 38 by the motor 34 drive not only the rack 32, but the valve stem and valve gate G upward of downward depending on sense of rotation.

Thus, there has been developed a readily attached drive, which may be remotely operable, for the gate of the discharge valve of an RV. The attachment housing easily snaps into place and, because the attachment housing is flat and thin (FIG. 5), it takes up minimum space in the compartment. The fastener 40 readily clips onto the valve handle.

Controls, schematically shown in FIG. 2, may include means to count the revolutions of the motor 34 to limit the travel of the rack opened down. Further, the circuitry may include means to de-energize the motor when it has reached the upward or downward travel limit.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A retrofit electro-mechanical actuator assembly for the remote operation of a manually operable tank drain valve installed on a recreational vehicle, the drain valve having a housing enclosing a linearly sliding gate with an open and a closed position at the extremes of its travel and a manually operable T-shaped valve handle attached thereto which slides in a linear, bi-directional manner to move the sliding gate between its open and closed positions, the assembly comprising:

a. resilient housing comprising a back wall and connected side walls arranged in channel-shape in horizontal cross-section and having inward detents along the distal ends of the side walls, the detents comprising attachment means for removably securing the housing to the drain valve;

b. a rack reciprocally supported by the housing;

c. a reversible electric drive motor selectively powered to produce clockwise or counter-clockwise rotational drive, and unpowered to place it in a stationary, disabled state, the motor having a pinion engaging the rack and adapted to impart reciprocal drive thereto and supported by the housing;

d. a handle-securing fastener at the upper end of the rack comprising a base adapted to fit against the underside of a wing of the T-shaped handle and a resilient clip having an end hinged to the base and adapted to swing over the top of the wing and having a latch at the other end of the clip adapted to snap closed under the underside of a portion of the base to enclose the wing and attach the rack to the handle.

2. An actuator assembly as claimed in claim 1 wherein the detents are formed with lead-ins so that the attachment housing can be pressed toward the valve housing, the lead-ins camming the side walls to spread them, the walls snapping back after the detents pass the sides of the valve housing to secure the attachment housing to the valve housing.

3. An actuator assembly as claimed in claim 1 further including a control remote from the drain valve for connecting and disconnecting electrical energy to the drive motor to selectively cause the drive motor to produce clockwise or counter-clockwise rotational drive.

\* \* \* \* \*